UNITED STATES PATENT OFFICE.

GEORG MERLING, OF BERLIN, GERMANY.

COMPOUND OF GAMMA-OXYPIPERIDIN-CARBOACIDS AND PROCESS OF MAKING SAME.

SPECIFICATION forming part of Letters Patent No. 591,483, dated October 12, 1897.

Application filed September 13, 1895. Serial No. 562,437. (Specimens.)

*To all whom it may concern:*

Be it known that I, GEORG MERLING, a citizen of the German Empire, residing at 170 and 171 Muellerstrasse, Berlin, in the German Empire, have invented certain new and useful Improvements in Processes of Preparing Nitryls of Gamma-Oxypiperidin Carboacids, Gamma-Oxypiperidin-Carboacids, and Derivatives Therefrom; and I do hereby declare the following to be a full, clear, and exact description of the invention, such as will enable others skilled in the art to which it appertains to make and use the same.

I have discovered that new chemical combinations can be obtained which are derivatives of the gamma-oxypiperidin-carboacid and have a composition corresponding to the following fundamental formula:

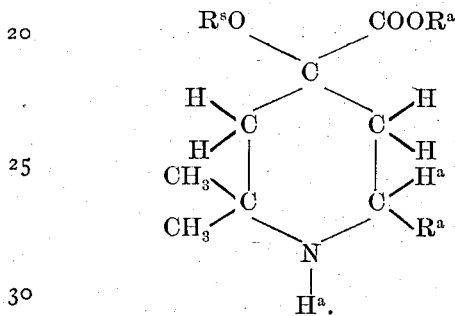

In this formula $H^a$ signifies one atom of hydrogen, which can be replaced by an alkyl group, (alcoholic radical,) and $R^a$ signifies a monovalent alkyl group, (alcoholic radical,) while $R^s$ signifies a monovalent acidyl group. The following may be chosen as such alkyl groups, (alcoholic radicals,) for instance: methyl, ($CH_3$,) ethyl, ($C_2H_5$,) propyl, ($C_3H_7$,) allyl, ($C_3H_5$,) and phenyl, ($C_6H_5$,) and as acidyl groups the following may be chosen, for instance: benzoyl, ($C_6H_5CO$,) toluyl, ($C_6H_4CH_3$ CO,) phenyl-acetyl, ($C_6H_5CH_2CO$,) phenyl-chloracetyl, ($C_6H_5CHClCO$,) and cinnamyl, ($C_6H_5CHCHCO$.) All these compounds in the form of free bases are hardly soluble in water and form by the combination with inorganic and strong organic acids the corresponding salts. The hydriodates of these bases are hardly soluble and split up by being perseveringly or continuously boiled with alkali, thereby forming, corresponding to the alkyl group and to the acidyl group and to gamma-oxypiperidin-carboacid of the said compounds, the corresponding alcohol, acid, and gamma-oxypiperidin-carboacid, respectively.

I have also discovered that the gamma-oxypiperidin carboacids which possess a chemical constitution according to the above-mentioned formula, in which the acidyl group as well as the alkyl group bound to the carboxyl are replaced with hydrogen atoms, are obtained by combining hydrocyanic acid with triacetonamin or with bodies or combinations constituted analogous to the triacetonamin, such as with benzaldiacetonamin, vinyl-diacetonamin, &c., and then by saponifying the so-obtained cyanhydrins, (nitryls.)

The reactions that take place may be explained by the following equations:

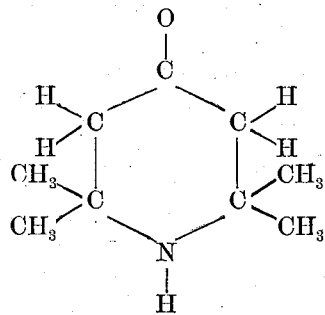

Triacetonamin.

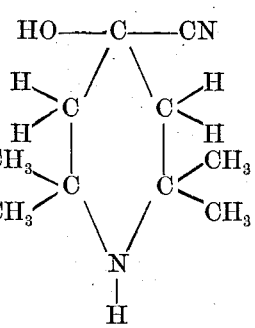

Nitryl of the tetramethyl-gamma-oxypiperidin-carboacid.

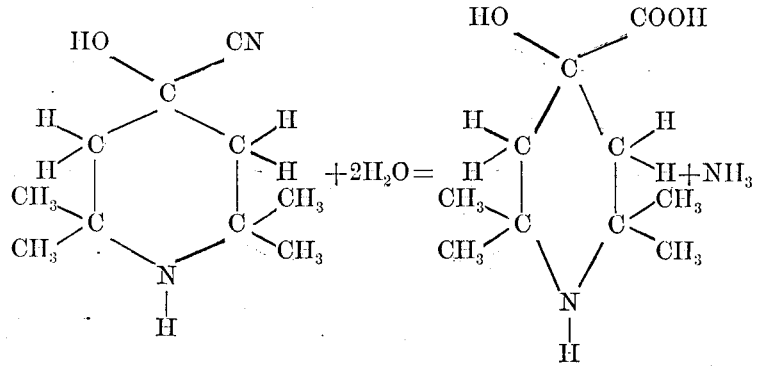

Tetramethyl-gamma-oxypiperidin-carboacid.

The preparation of the gamma-oxypiperidin-carboacids will be understood from the following example of the preparation of tetramethyl-gamma-oxypiperidin-carboacid: To a concentrated aqueous solution of one kilogram of triacetonamin mixed with 0.5 kilogram of cyanid of potassium, (ninety-eight per cent.,) (which solution is to be cooled by means of ice,) 0.8 kilogram of concentrated aqueous muriatic acid is added while stirring the mass. The solution is then saturated with gaseous hydrochloric acid, and the so-formed cyanhydrin (nitryl) is thereupon saponified by boiling such solution during several hours in a reflux-condenser. The excess of hydrochloric acid is driven off on a water-bath, the residue dissolved in diluted caustic-soda lye, and this solution is acidulated at the boiling-temperature with acetic acid. Now tetramethyl-gamma-oxypiperidin-carboacid separates as a colorless crystalline powder, from which the adhering liquid or solution is then eliminated as much as possible in any suitable manner, as by suction or by any known means, after which the crystalline powder is washed with water and dried. The analogous gamma-oxypiperidin-carboacids are obtained essentially in the same manner, of course substituting equivalent quantities of benzaldiacetonamin, vinyl-diacetonamin, &c., for the triacetonamin employed in the example above described. In this way besides the tetramethyl-gamma-oxypiperidin-carboacid, which melts at 285° centigrade under decomposition, other gamma-oxypiperidin-carboacids can be obtained, for instance:

First. From benzaldiacetonamin the dimethylphenyl-gamma-oxypiperidin-carboacid, which melts at 250° to 270° centigrade, and having a constitution according to the formula—

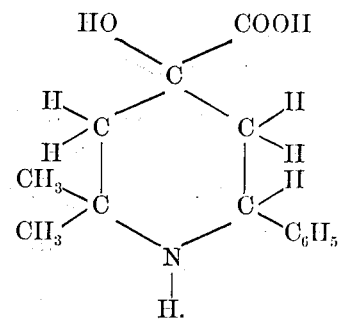

Second. From vinyl-diacetonamin the trimethyl-gamma-oxypiperidin-carboacid having a constitution according to the formula—

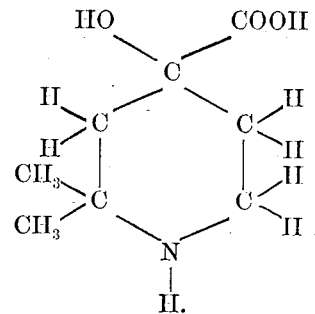

The n-alkyl-gamma-oxypiperidin-carboacids can be obtained in the same way by starting with n-alkyltriacetonamin, or n-alkyl-benzaldiacetonamin, &c., the "n-" signifying that the alkyl group immediately after the ether is bound directly to the nitrogen (N) atom.

The properties of these gamma-oxypiperidin-carboacids are as follows: The gamma-oxypiperidin-carboacids form crystalline colorless powders almost insoluble in water, in alcohol, in ether, in solutions of ammonia or of alkali-carbonates, and in dilute acetic acid.

In solutions of caustic alkalies and in diluted mineral acids said carboacids are readily soluble and can be precipitated in an unchanged state from alkaline solutions by means of acetic acid and from acid solutions by means of acetate of sodium, either slowly at low temperature or rapidly at a higher temperature, while they decompose when heated to a very high temperature, their color changing into black and develop gases. From these gamma-oxypiperidin-carboacids the new combinations or compounds, the composition of which has been explained in the beginning of this description, can be obtained according to the present invention by replacing the hydrogen of the carboxyl and of the imid group with alcoholic radicals and the hydrogen atom of the hydroxyl with acid radicals.

Production of ethers of the gamma-oxypiperidin-carboacids.

Example: Preparation of methylic ether of the tetramethyl-gamma-oxypiperidin-carboacid: Upon one kilogram tetramethyl-gamma-oxypiperidin-carboacid an equal weight of methylic alcohol is poured. This liquid mass is heated to boiling and is saturated by introducing hydrochloric-acid gas. After the mass has been allowed to stand for a day the greater part of the produced hydrochlorate of the methylic ether of the tetramethyl-gamma-oxypiperidin-carboacid is deposited in the form of colorless firm crystals, which, after being separated from the mother-lye, are washed with small quantities of methylic alcohol and then dried.

By the action of a solution of soda or of carbonate of soda the hydrochlorate is decomposed and the methylic ether of tetramethyl-gamma-oxypiperidin-carboacid is set free. The same is constituted according to the formula

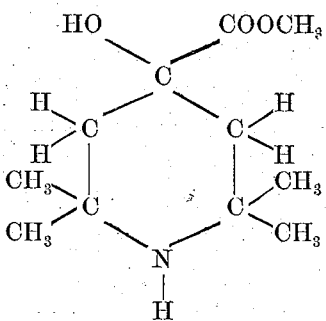

and is a colorless, beautifully crystallizing body, the melting-point of which is from 69° to 70° centigrade.

In an analogous manner the methylic ethers of the dimethyl-phenyl-gamma-oxypiperidin-carboacid, or of trimethyl-gamma-oxypiperidin-carboacid, or of n-methyl-tetramethyl-gamma-oxypiperidin-carboacid are obtained, and in like manner also the preparation of other homologous ethers, for instance, of the ethylic ether of tetramethyl-gamma-oxypiperidin-carboacid,

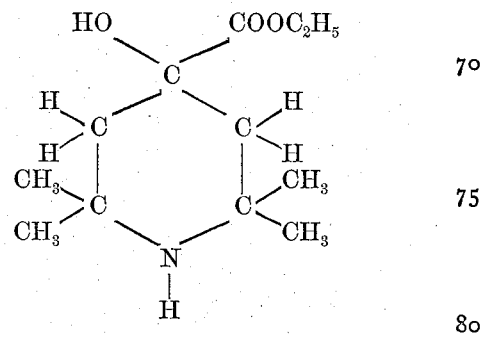

the melting-point of which is from 96° to 97° centigrade. All these ethers have the following properties: They are colorless crystalline bodies which are soluble in almost all known solvents and are saponified either at once by boiling with water or slowly in a cold aqueous solution, thereby separating the free gamma-oxypiperidin-carboacid. By causing alkyl-iodid to act upon the free ethers the hydriodates of the n-alkylated ethers may be obtained from which the free n-alkylated ethers are liberated by the addition of carbonate of sodium or of similar alkalies. The n-methyl-tetramethyl-gamma-oxypiperidin-carboacid-methyl-ether represents an oil which distils in the vacuum without undergoing decomposition. The n-methyl-trimethyl-gamma-oxypiperidin-carboacid-methyl-ether crystallizes from ligroin into compact crystals, melting at 82° to 84° centigrade. Furthermore, compounds such as the ethers of the gamma-oxypiperidin-carboacids may be obtained having the composition expressed by the fundamental formula first herein referred to, in which compounds the hydrogen atom bound to the nitrogen atom has not been replaced by a radical.

Example: Preparation of methylic ether of benzoyl-tetramethyl-gamma-oxypiperidin-carboacid: Upon one kilogram pulverized dydrochlorate of the methylic ether of tetramethyl-gamma-oxypiperidin-carboacid one kilogram benzoyl-chlorid is poured, and while stirring and under addition of a small quantity of zinc chlorid the mixture is heated on an oil-bath to from about 140° to 145° centigrade as long as hydrochloric acid develops. The brown syrup-like mass is then poured into ice-water and repeatedly shaken with ether in order to eliminate excessive benzoyl-chlorid. By adding caustic-soda lye to the aqueous solution after being separated from the ether the methylic ether of benzoyl-tetramethyl-gamma-oxypiperidin-carboacid is precipitated in the form of a sticky gradually-hardening mass which is extracted by ether. When the ether is distilled off, the compound remains as a yellowish syrup, which on cooling changes into a crystalline mass and can be purified by dissolving in ligroin and by crystallization from such solution. This compound is readily soluble in alcohol, ether, chloroform, benzene, crystallizes from hot ligroin in the form of beautiful colorless prisms, melting at 91° to 92° centigrade, and combines with inorganic and organic acids, thus forming salts of neutral reaction. Of such salts the following have, for instance, been obtained: nitrate, nitrite, hydrochlorate, hydrobromate, hydriodate, sulfate, borate, phosphate, dicarbonate, formiate, acetate, citrate, tartrate, succinate, salicylate, alphabenzoate, salt of the tropaacid, lactate, malate. All these salts are hardly soluble in cold water, and among these salts the formiate is the most soluble. It forms large bright crystals.

In an analogous manner the alkylic ethers of the characterized composition are prepared. Examples of the same may be mentioned, as follows:

Methylic ether of benzoyldimethyl-phenyl-gamma-oxypiperidin-carboacid

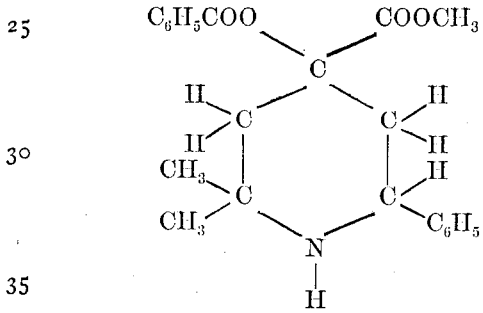

crystallizes from ligroin in the form of colorless prisms, melting at 110° to 111° centigrade, and combines with inorganic and organic acids, thereby forming salts of neutral reaction. The hydrochlorate is easily soluble in water.

Methylic ether of benzoyltrimethyl-gamma-oxypiperidin-carboacid

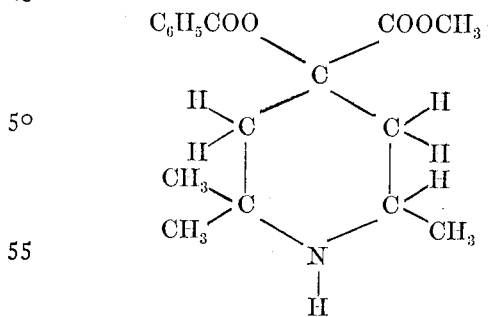

is a colorless crystallizing body, which melts at about 100° centigrade.

Ethylic ether of benzoyltetra-methyl-gamma-oxypiperidin-carboacid

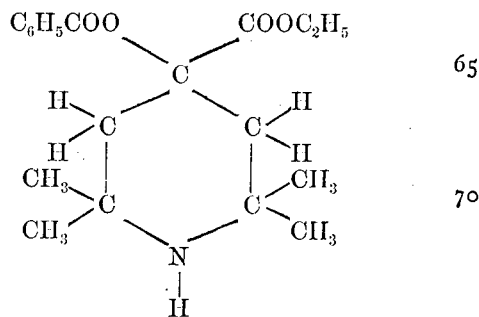

forms colorless prisms, melting at 85° to 86° centigrade.

Methylic ether of ortho-toluyltetra-methyl-gamma-oxypiperidin-carboacid

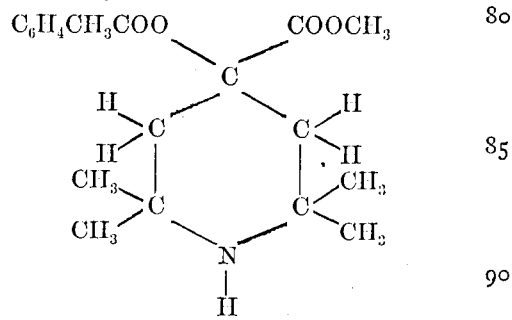

melting-point at about 90° centigrade.

If the described preparation relates to the compounds of the present invention corresponding to the aforesaid fundamental formula in which the hydrogen atom bound to the nitrogen of the nucleus is replaced by an alkyl group, the same may be performed by the known substitution of an alkyl for the hydrogen atom $H^a$, bound to the nitrogen atom, for instance, by the action of a halogen alkyl, in the ethers of the acidyl-gamma-oxypiperidin-carboacids obtained as before described.

If the compounds to be prepared contain the same alkyl group instead of the hydrogen atom $H^a$ of the carboxylic group as well as of the imid group, this method may be varied so as to treat a salt of the acidyl-gamma-oxypiperidin-carboacid (obtainable by heating the corresponding gamma-oxypiperidin-carboacid or its hydrochlorate with the chlorid of the acidyl to be introduced into the said carboacid) or the free acid in an alcoholic solution with caustic alkali and halogen alkyl. In this way the formation, for instance, of the methylic ether of n-methylbenzoyltetramethyl-gamma-oxypiperidin-carboacid takes place according to the following equation:

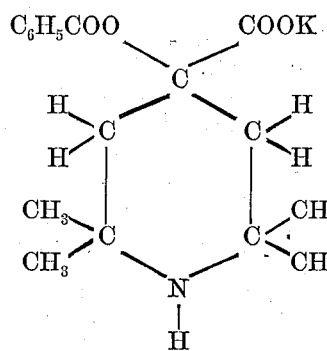 +KOH+2CH₃I= 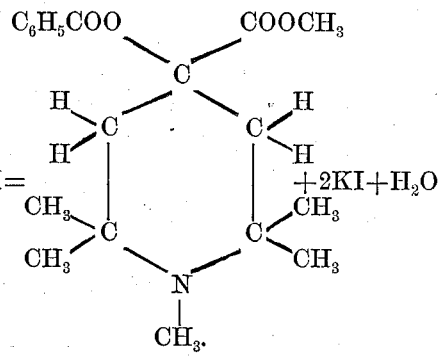 +2KI+H₂O

The production of the n-alkylated acidyl-gamma-oxypiperidin-carboacid ethers can further be effected by acidulating a n-alkylated gamma-oxypiperidin-carboacid or a salt thereof and then etherifying the resulting compound or by acidulating the ethers of the n-alkylated gamma-oxypiperidin-carboacid suitably with anhydrous acids. In this manner the following compounds can, for instance, be obtained:

Methylic ether of n-methylbenzoyltetramethyl-gamma-oxypiperidin-carboacid

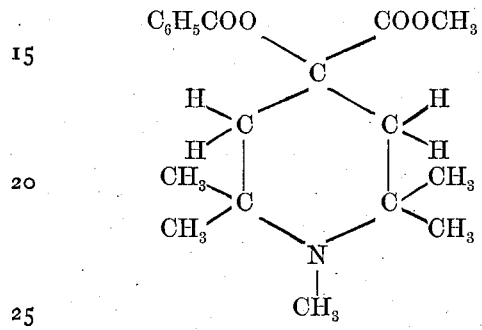

crystallizes from ether in the form of large well-developed crystals. Melting-point 104° to 105° centigrade. The hydrochlorate of this body crystallizes in tablets or small leaves, being readily soluble in water.

Methylic ether of n-ethylbenzoyltetramethyl-gamma-oxypiperidin-carboacid,

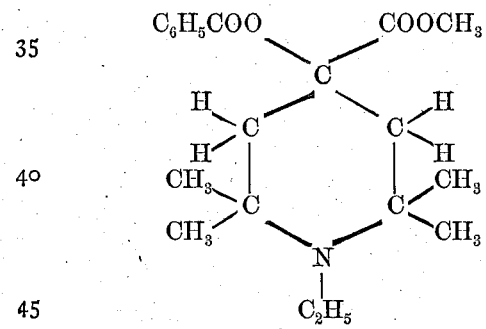

crystallizes in colorless prisms from ligroin, and melts at about 94° centigrade.

Ethylic ether of n-methylbenzoyltetramethyl-gamma-oxypiperidin-carboacid,

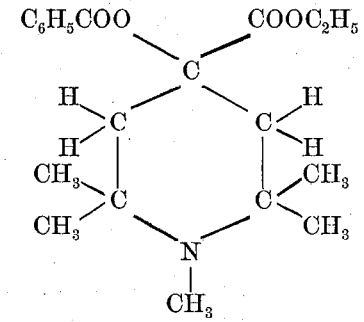

crystallizes in colorless compact crystals from ligroin and melts at about 90° centigrade.

Ethylic ether of n-ethylbenzoyltetramethyl-gamma-oxypiperidin-carboacid,

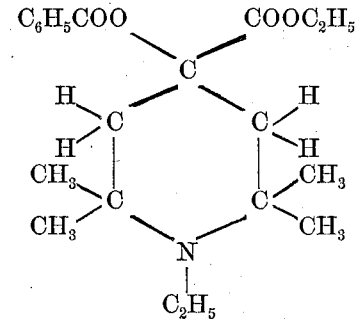

crystallizes in colorless compact crystals from ligroin and melts at about 91° to 92° centigrade.

Methylic ether of n-propylbenzoyltetramethyl-gamma-oxypiperidin-carboacid,

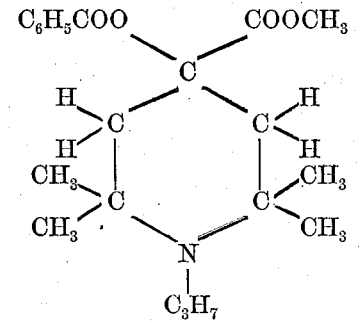

crystallizes in needles, melting at about 95° centigrade. The hydrochlorate of this body crystallizes in needles and small leaves.

Methylic ether of n-allylbenzoyltetramethyl-gamma-oxypiperidin-carboacid,

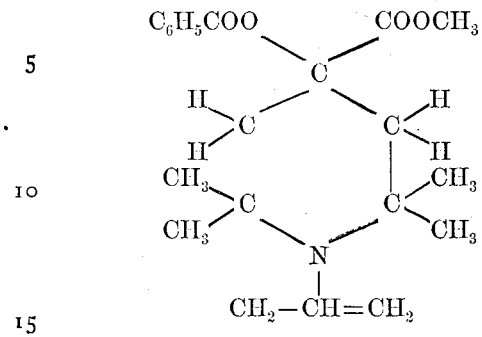

forms a powder, melting at about 91° centigrade.

Methylic ether of n-methylbenzoyldimethyl-phenyl-gamma-oxypiperidin-carboacid,

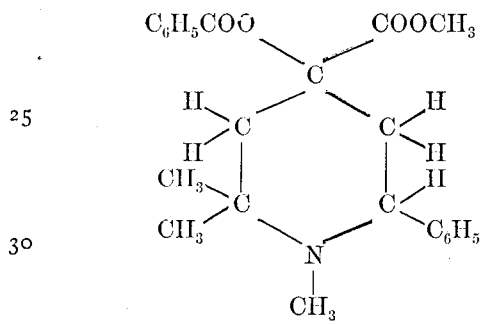

melting-point at about 130° to 131° centigrade.

Methylic ether of n-methylbenzoyltrimethyl-gamma-oxypiperidin-carboacid,

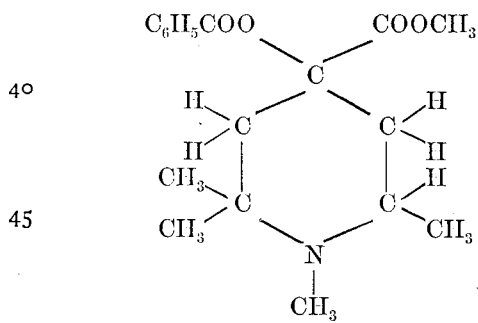

crystallizes from petroleum-ether in small needles, disposed star-like.

Methylic ether of n-methyl-ortho-toluyltetramethyl-gamma-oxypiperidin-carboacid,

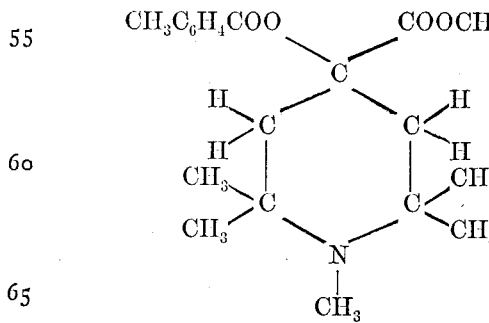

melting-point at 92° centigrade.

Methylic ether of n-methyl-para-toluyltetramethyl-gamma-oxypiperidin-carboacid,

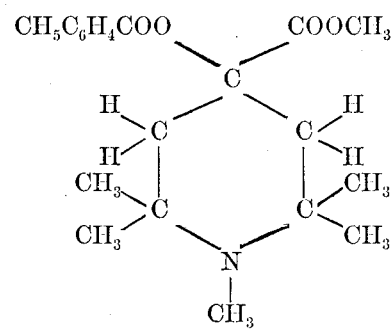

melting-point at 122° centigrade.

Methylic ether of n-methyl-phenylacetyltetramethyl-gamma-oxypiperidin-carboacid—

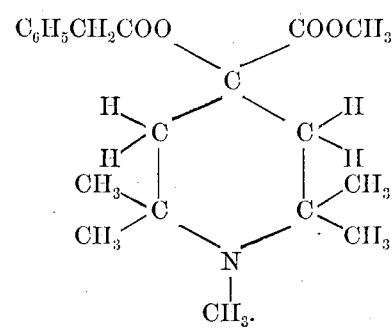

Methylic ether of n-methylphenylchloracetyl-tetramethyl-gamma-oxypiperidin-carboacid,

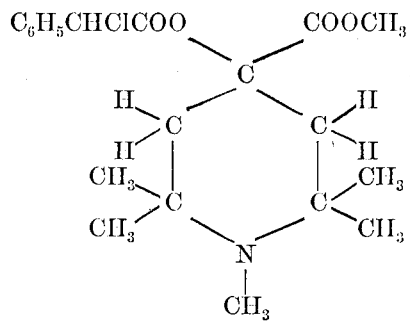

melting-point at 120° to 121° centigrade.

Methylic ether of n-methylphenyl-bromacetyl-tetramethyl-gamma-oxypiperidin-carboacid,

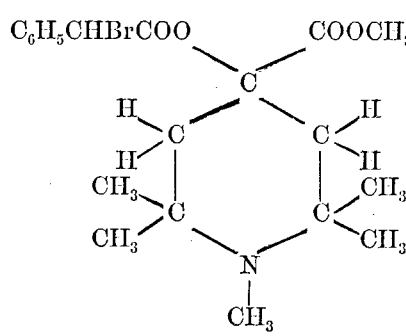

melts from ether at about 117° to 118° centigrade.

Methylic ether of n-methyl-cinnamyl-tetramethyl-gamma-oxypiperidin-carboacid,

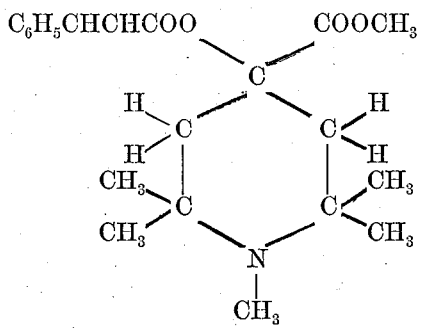

melts at about 125° to 126° centigrade.

Having thus described my invention, what I claim as new therein, and desire to secure by Letters Patent, is—

1. As new chemical products, compounds of gamma-oxypiperidin-carboacids which are mostly colorless crystals containing acidyl as well as alkyl groups and whose composition corresponds to the formula

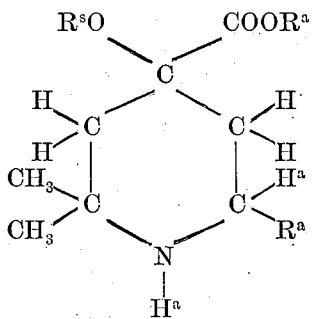

wherein $H^a$ signifies a hydrogen atom which can be replaced by an alkyl group, $R^s$ an acidyl group, and $R^a$ an alkyl group, said compounds in the form of free bases being nearly insoluble in water, adapted to combine with inorganic and strong organic acids to form corresponding salts, the hydriodates being almost insoluble in water, while by continued boiling of said compounds with alkalies the acidyl and alkyl groups are split off thereby forming the corresponding acid and alcohol and regenerating gamma-oxypiperidin-carboacid, substantially as set forth.

2. The process of manufacturing gamma-oxypiperidin-carboacids containing acidyl as well as alkyl groups and whose composition corresponds to the formula

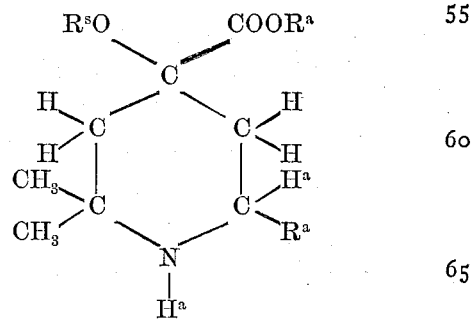

in which $H^a$ signifies a hydrogen atom, which can be replaced by an alkyl group, $R^s$ an acidyl group and $R^a$ alkyl groups, which consists in combining triacetonamin and its analogous combinations, as for instance benzaldiacetonamin, vinyl-diacetonamin, with hydrocyanic acid, and then saponifying the so-obtained cyanhydrins (nitryls), substantially as described.

3. In a process of manufacturing compounds of gamma-oxypiperidin-carboacids containing both acidyl and alkyl groups, the step of heating gamma-oxypiperidin-carboacid, with both acidyl and alkyl reagents, whereby the acidyl and alkyl groups are introduced into combination with the gamma-oxypiperidin-carboacid, substantially as set forth.

In testimony whereof I have signed my name, in the presence of two subscribing witnesses, this 31st day of August, 1895.

GEORG MERLING.

Witnesses:
  W. HAUPT,
  N. TOLMAN.